US008131611B2

(12) United States Patent
O'Sullivan et al.

(10) Patent No.: US 8,131,611 B2
(45) Date of Patent: Mar. 6, 2012

(54) STATISTICS BASED METHOD FOR NEUTRALIZING FINANCIAL IMPACT OF CLICK FRAUD

(75) Inventors: Patrick J. O'Sullivan, Ballsbridge (IE); Edith H. Stern, Yorktown Heights, NY (US); Robert C. Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 11/617,170

(22) Filed: Dec. 28, 2006

(65) Prior Publication Data

US 2008/0162200 A1 Jul. 3, 2008

(51) Int. Cl.
G06Q 30/00 (2006.01)
G07F 19/00 (2006.01)
(52) U.S. Cl. ............................................. 705/34; 705/14
(58) Field of Classification Search ...................... 705/34
See application file for complete search history.

(56) References Cited

U.S. PATENT DOCUMENTS

| | | | | |
|---|---|---|---|---|
| 7,076,476 | B2 * | 7/2006 | Judd et al. ............................... | 1/1 |
| 7,139,916 | B2 * | 11/2006 | Billingsley et al. ............ | 713/182 |
| 7,337,324 | B2 * | 2/2008 | Benaloh et al. ................ | 713/182 |
| 7,657,626 | B1 * | 2/2010 | Zwicky ........................... | 709/224 |
| 2003/0101451 | A1 * | 5/2003 | Bentolila et al. ................. | 725/34 |
| 2003/0216930 | A1 * | 11/2003 | Dunham et al. .................. | 705/1 |
| 2005/0065802 | A1 * | 3/2005 | Rui et al. ........................... | 705/1 |
| 2005/0120201 | A1 * | 6/2005 | Benaloh et al. ................ | 713/155 |
| 2005/0144067 | A1 * | 6/2005 | Farahat et al. ................... | 705/14 |
| 2006/0004594 | A1 * | 1/2006 | Doliov ............................... | 705/1 |
| 2006/0069697 | A1 * | 3/2006 | Shraim et al. .................. | 707/102 |
| 2006/0095578 | A1 * | 5/2006 | Paya et al. ...................... | 709/229 |
| 2006/0136294 | A1 * | 6/2006 | Linden et al. ................... | 705/14 |
| 2006/0212350 | A1 * | 9/2006 | Ellis et al. ....................... | 705/14 |
| 2006/0253319 | A1 * | 11/2006 | Chayes et al. ................... | 705/14 |
| 2007/0033106 | A1 * | 2/2007 | Mason ............................. | 705/14 |
| 2007/0073579 | A1 * | 3/2007 | Immorlica et al. ............... | 705/14 |
| 2007/0083519 | A1 * | 4/2007 | Daniels et al. .................. | 707/10 |
| 2007/0086587 | A1 * | 4/2007 | Farahat et al. .................. | 380/28 |
| 2007/0179849 | A1 * | 8/2007 | Jain ................................. | 705/14 |
| 2007/0192190 | A1 * | 8/2007 | Granville ........................ | 705/14 |
| 2007/0239560 | A1 * | 10/2007 | McGuire et al. ................ | 705/26 |
| 2007/0239604 | A1 * | 10/2007 | O'Connell et al. ............. | 705/50 |
| 2007/0255821 | A1 * | 11/2007 | Ge et al. .......................... | 709/224 |
| 2008/0010307 | A1 * | 1/2008 | Doliov ........................... | 707/100 |
| 2008/0052278 | A1 * | 2/2008 | Zlotin et al. ...................... | 707/3 |
| 2008/0052629 | A1 * | 2/2008 | Phillips et al. ................. | 715/736 |
| 2008/0059301 | A1 * | 3/2008 | Granville ........................ | 705/14 |
| 2008/0066014 | A1 * | 3/2008 | Misra ............................. | 715/846 |
| 2008/0077561 | A1 * | 3/2008 | Yomtobian ....................... | 707/3 |
| 2008/0092058 | A1 * | 4/2008 | Afergan et al. ................ | 715/745 |

(Continued)

*Primary Examiner* — Elaine Gort
*Assistant Examiner* — Ashford S Hayles
(74) *Attorney, Agent, or Firm* — Law Office of Jim Boice

(57) ABSTRACT

A method, system and computer-readable medium for reducing a financial impact of click fraud are presented. In a preferred embodiment, the method includes, but is not limited to, the steps of: testing a sample of click events for fraudulent clicks of the PPC link, wherein the testing of the sample of click events for fraudulent clicks is directed to detecting fraudulent non-human clicks of the PPC link; and in response to a percentage of clicks failing the testing being greater than a pre-determined tolerance level, reducing a charge for clicks of the PPC link.

19 Claims, 5 Drawing Sheets

U.S. PATENT DOCUMENTS

| | | | |
|---|---|---|---|
| 2008/0103903 A1* | 5/2008 | Flake et al. | 705/14 |
| 2008/0109553 A1* | 5/2008 | Fowler | 709/229 |
| 2008/0114624 A1* | 5/2008 | Kitts | 705/7 |
| 2008/0147456 A1* | 6/2008 | Broder et al. | 705/7 |
| 2008/0147499 A1* | 6/2008 | Pitkow et al. | 705/14 |
| 2008/0147847 A1* | 6/2008 | Pitkow et al. | 709/224 |
| 2008/0162227 A1* | 7/2008 | Jakobsson et al. | 705/7 |
| 2008/0189409 A1* | 8/2008 | Pitkow et al. | 709/224 |
| 2008/0288303 A1* | 11/2008 | Gray et al. | 705/7 |
| 2009/0132363 A1* | 5/2009 | Powell et al. | 705/14 |

\* cited by examiner

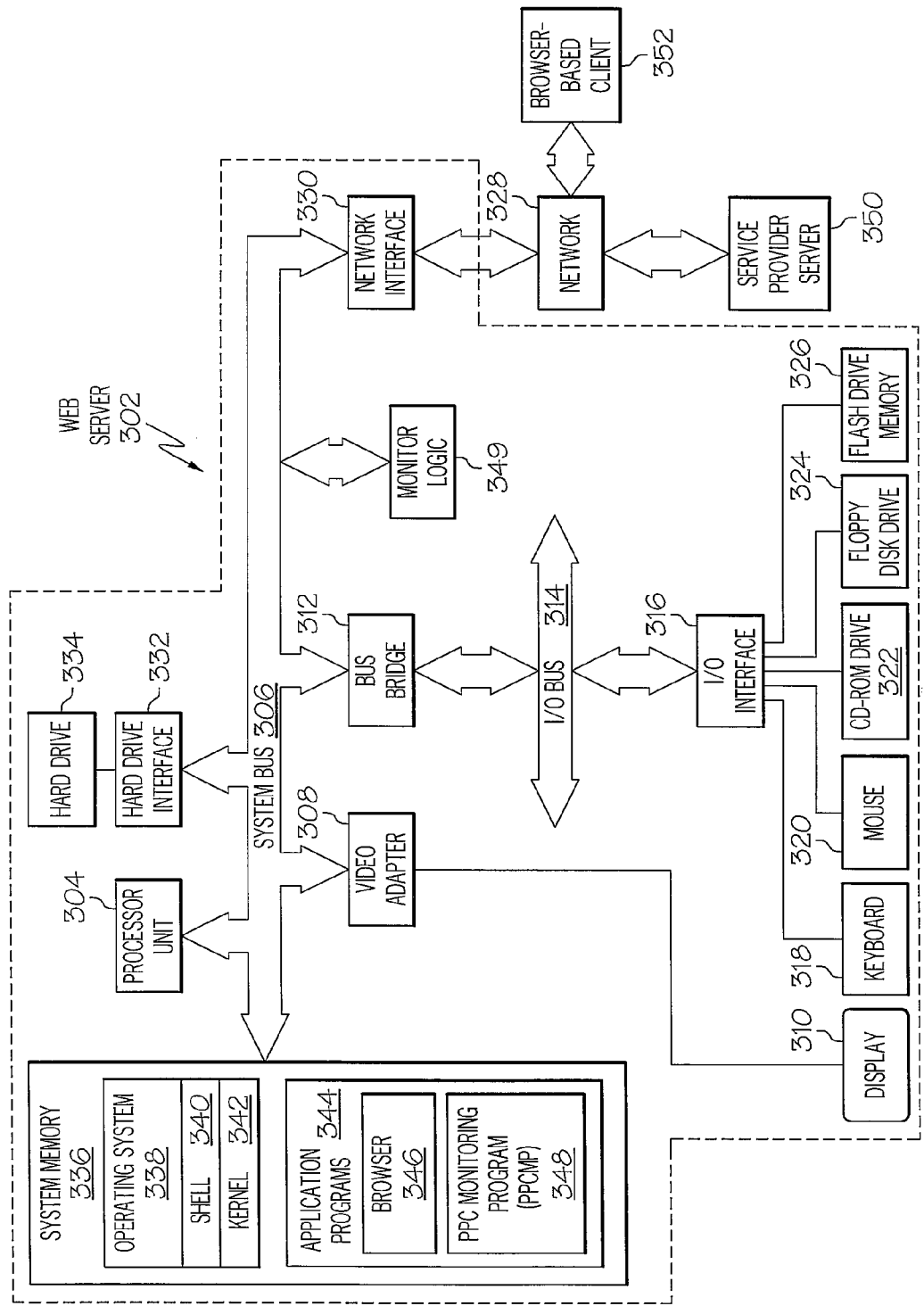

STATISTICS BASED METHOD FOR NEUTRALIZING FINANCIAL IMPACT OF CLICK FRAUD

BACKGROUND OF THE INVENTION

The present patent application relates in general to the field of computers and other data processing systems, including hardware, software and processes. More particularly, the present patent application pertains to the billing management of Pay Per Click (PPC) advertisements.

Pay Per Click (PPC) is a fundamental market of the Internet. In a PPC model, an Advertiser creates a clickable advertisement link from a popular public website that is maintained by a Publisher. Whenever a visitor to that website clicks the advertisement link, the Advertiser pays the Publisher of the popular public website a fee. That is, the Advertiser pays the Publisher for each "click through" that a visitor to the Publisher's website generates, thus paying the Publisher for each "referral" to the Advertiser's website.

Click Fraud (CF) occurs when a person or organization repeatedly generates clicks to a PPC advertisement with the intent of generating an improper charge to the Advertiser. Typically, this repeated clicking is automatically performed by a "clickbot," which is software-based logic that emulates movement of a pointer over the PPC advertisement and clicking thereon. Parties who may have an economic motivation to commit CF include the Publisher, an Advertising Network whose revenues are based on how often their advertisements are clicked, an Advertisement Agency whose revenues and/or reputation are enhanced according to how often the ads they create are clicked (regardless of which Publisher website publishes the PPC link), and competitors of the Advertiser who wish to deplete the Advertiser's advertising budget.

Although CF is clearly unethical and is illegal in several jurisdictions, the practice nonetheless continues, and according to some estimates, accounts for 2-20% of all clicks of PPC advertisements.

SUMMARY OF THE INVENTION

To address the problem of click fraud described above, presented herein is a computer-implementable method, system and computer media for reducing the financial impact of click fraud. The computer-implementable method, system and computer media are described and claimed separately and independently. In a preferred embodiment, the computer-implementable method includes, but is not limited to, the steps of: testing a sample of click events for fraudulent clicks of the PPC link, wherein the testing of the sample of click events for fraudulent clicks is directed to detecting fraudulent non-human clicks of the PPC link; and in response to a percentage of clicks failing the testing being greater than a predetermined tolerance level, reducing a charge for clicks of the PPC link.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 depicts an exemplary web server in which the present invention may be implemented.

DETAILED DESCRIPTION OF THE PREFERRED EMBODIMENT

Figure 1A:
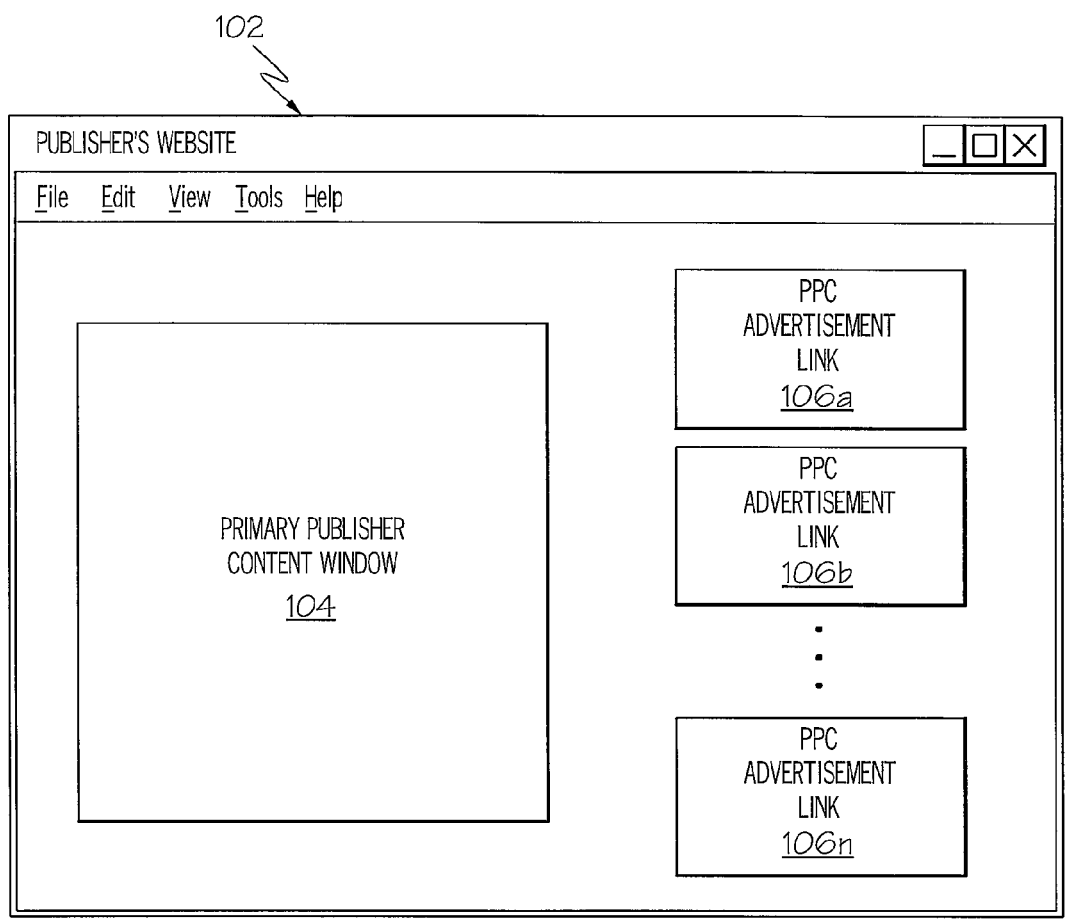
FIG. 1A depicts a publisher's website that contains an advertiser's Pay Per Click (PPC) advertisement link.

With reference now to the figures, and in particular to FIG. 1A, an exemplary publisher's website 102 is shown. The Graphical User Interface (GUI) that displays publisher's website 102 includes a primary publisher content window 104, which is the primary content of publisher's website 102. For example, primary publisher content window 104 may display content from a home page of a search engine, an enterprise's home page, a subscriber's content, etc. Publisher's website 102 also includes one or more Pay Per Click (PPC) advertisement links 106, including the illustrated PPC advertisement links 106a-n. (Note that while PPC advertisement link 106 is described as an advertisement link, in a preferred embodiment, PPC advertisement link 106 may be any type of PPC link, including a PPC link for information, service, etc.) A PPC advertisement link 106 is an active link to an advertiser's webpage. Thus, by clicking the PPC advertisement link 106, a visitor to publisher's website 102 is redirected to the website of the advertiser. Each time a visitor clicks the PPC advertisement link 106, underlying logic generates a count, which is used to bill the advertiser for the on-line "referral." Each time PPC advertisement link 106 is clicked, that click action is reported to a monitor logic 349 (see FIG. 3). As described below, a PPC monitoring program (PPCMP) 348 (also shown in FIG. 3) utilizes the click counts recorded by monitor logic 349 to adjust advertising rates for PPC advertisement links that are the victim of clickbots or similar malicious activity.

Figure 1B:
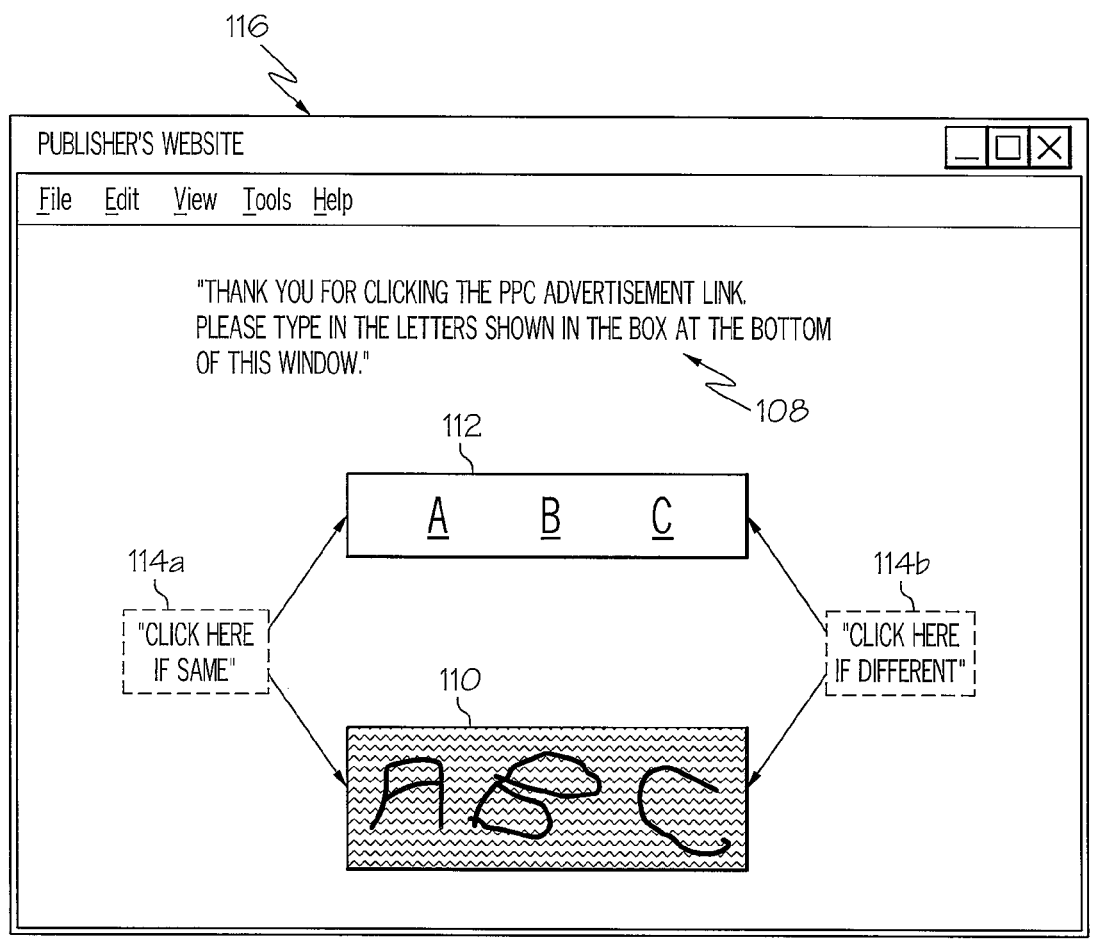
FIG. 1B illustrates a window in the publisher's website that tests for a human click of the PPC advertisement link.

In an effort to avoid "clickbots" automatically and repeatedly clicking PPC advertisement links 106, a graphical display of non-standard text characters is presented, as shown in FIG. 1B. After clicking a specific PPC advertisement link 106, an intermediate confirmation webpage 116, as shown in FIG. 1B, is presented. Dialogue presented in confirmation webpage 116 asks the user to perform, preferably on a random sampling of PPC advertisement link clicks, a confirmation task described in dialog box 108. Using a protocol found in Completely Automated Public Turing test to tell Computers and Humans Apart (CAPTCHA) or similar processes, the user is asked to view the characters in non-standard character box 110. Shown in exemplary manner are characters that a human can recognize as the letters "A B C." A computer cannot decipher these letters, particularly due to their distorted script and the interference background pattern. Humans, however, are able to easily decipher the characters as being "A B C," and can type these letters in an input box 112. Alternatively, input box 112 can be pre-populated with the same or different characters shown in non-standard box 110, thus alleviating the user from having to type in the characters (which may be difficult for a handicapped user). In this case, query blocks 114a-b are presented asking the user to confirm that the characters in the two boxes are the same (or different). Note that a "clickbot" may be programmed to "guess" at whether the boxes have the same or different characters, with a 50:50 chance of being correct. Thus, unless the user has preprogrammed his computer for special accessibility, a preferred embodiment is to require the user to type in the letters in input box 112. After typing in the characters in input box 112 (or clicking the appropriate query block 114), the user is then connected to the advertiser's webpage. Note that while confirmation webpage 116 is depicted as a "Publisher's Website," alternatively the confirmation process described herein may be hosted directly by the advertiser at the advertiser's webpage, or by a servicing third party that is hosting the confirmation webpage and handling the confirmation processes.

Figure 2A:
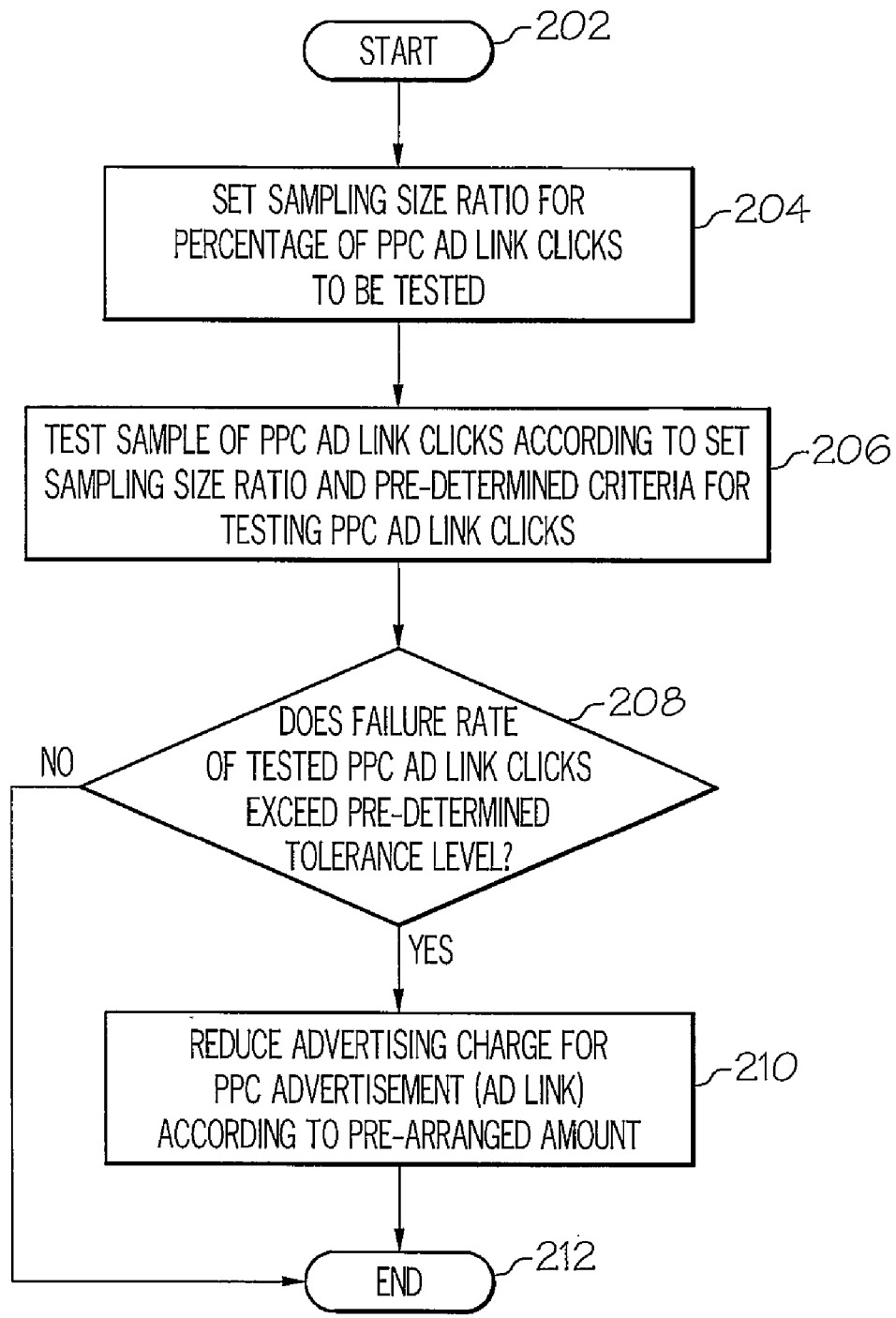
FIGS. 2A-B are flow-charts of exemplary steps taken to adjust an advertisement fee charged if the number of non-human clicks of the PPC advertisement link exceeds a predetermined level.

Referring now to FIG. 2A, a flow-chart of exemplary steps taken to reduce a financial impact of fraud click is presented. After initiator block 202 (which may be a decision to design a PPC advertisement link in a publisher's website), a sampling size ratio (percentage) is set for what percentage of PPC advertisement link clicks are to be tested to determine what fraction of clicks to the PPC advertisement link come from humans, not clickbots (block 204). This sampling size ratio is statistically driven to test a significant number of clicks, without being unduly burdensome to the system. Note that this sampling size can be dynamically adjusted, according to historical data, real-time events, etc., and is preferably less than all detected PC advertisement link clicks. Similarly, if a higher level of accuracy is desired, then the sampling size ratio is increased. For example, assume that an advertiser has entered into a contract, with a publisher, which states 1) the advertiser will only have to pay for authorized clicks of his PPC advertisement link, and 2) the publisher will sample enough clicks of PPC advertisement links to ensure a sampling accuracy of +/−1%. Such accuracy would require more sampling than that required for an accuracy of +/−10%. Thus, the advertiser will adjust the sampling rate according to what is needed to achieve the required sampling accuracy.

The PPC advertisement link clicks are tested according to predetermined criteria set for the PPC advertisement link (block 206). These pre-determined criteria are any so desired by the developer of the PPC advertisement link and its billing. For example, a pre-determined tolerance level may be based on a maximum number of expected non-fraudulent clicks of the PPC advertisement link during a set amount of time (e.g., 100 clicks during a one hour period). This maximum number may be set by any factor considered significant by the software developer, including the time of day, IP addresses of browsing computers that are viewing the publisher's website (and thus the PPC advertisement link), seasonal shopping periods (e.g., Christmas, etc.), whether the PPC advertisement link is associated with an industry or activity that is more prone to fraudulent links (e.g., "voting" links for viewers to vote on their favorite artist, video, song, etc.), etc. If the actual number of clicks exceeds the expected number, then a crude calculation of the difference between the expected and actual clicks can be used to determine that the excessive clicks are fraudulent, and the amount charged to the advertiser is accordingly reduced in a fixed, proportional, or sliding scale manner.

Figure 2B:
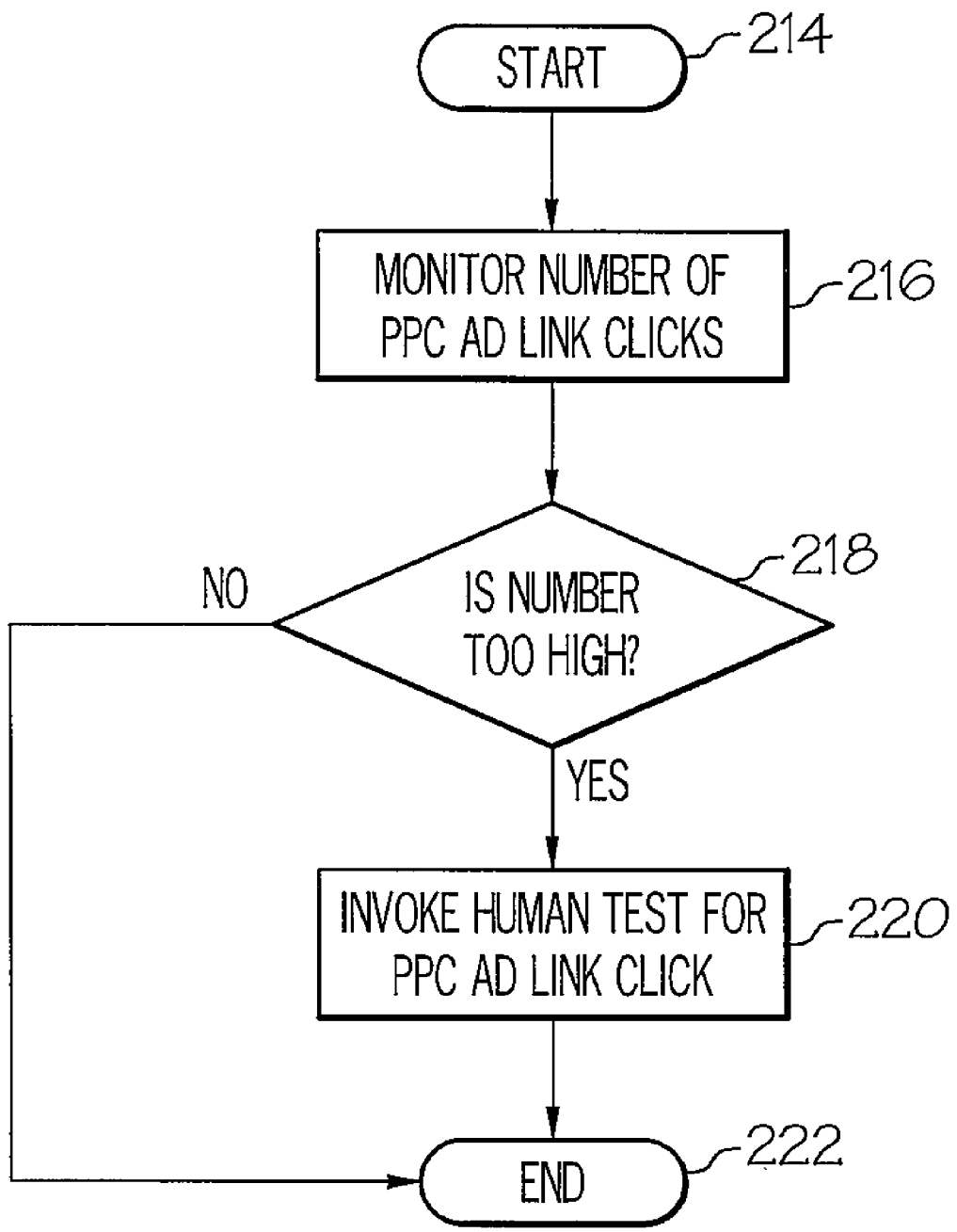

In another embodiment, the steps generally described in block 206 may be expanded to include the steps shown in FIG. 2B. After initiator block 214 (e.g., when a decision is made to set the pre-determined criteria for testing the PPC advertisement link clicks), the number of PPC advertisement link clicks is monitored for a pre-determined period of time (block 216). If the number of clicks is not too high, then the sub-process ends (terminator block 222), and the main process returns to block 206 in FIG. 2A. However, if the number exceeds the expected number of clicks (query block 218), then a more detailed testing can involve the use of a CAPTCHA or similar scheme (block 220), which confirms that a human has actually clicked the PPC advertisement link.

Returning to FIG. 2A, a determination is made (query block 208) as to whether the PPC advertisement link has been clicked too often, or more preferably, if too many CAPTCHA-type tests are failed. Note that the number of failed CAPTCHA-type tests preferably takes into account the fact that many legitimate clickers of the PPC advertisement link will 1) erroneously read/input the CAPTCHA characters or 2) simply not wish to participate in the CAPTCHA-type screen. For example, assume that 20% of the PPC advertisement link clicks fail the CAPTCHA test. A valid assumption may be that 20% of the legitimate clickers decline/fail to perform the CAPTCHA test, and thus there will be no adjustment to the overall advertisement rate (fee) charged to the advertiser. In order to minimize the number of such decliners, a financial incentive (micropayment, entry into a lottery, coupon, etc.) may be offered to the user.

Once it has been determined that there is malicious clickbot activity, then the amount charged to the advertiser is reduced accordingly (block 210), preferably for all websites hosting the PPC advertisement link. That is, the sampling/determination steps described herein provide the host of the PPC advertisement link with enough information to provide an equitable discount to the advertiser, such that the advertiser's budget is not depleted. The process ends at terminator block 212.

With reference now to FIG. 3, there is depicted a block diagram of an exemplary web server 302, in which the present invention may be utilized. Web server 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Web server 302 is able to communicate with a service provider server 350 via a network 328 using a network interface 330, which is coupled to system bus 306. Network 328 may be an external network such as the Internet, or an internal network such as an Ethernet or a Virtual Private Network (VPN). Using network 328, web server 302 is able to use the present invention to access service provider server 350.

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in web server 302. This volatile memory may include additional higher levels of volatile memory (not shown), including but not limited to cache memory, registers, and buffers. Data that populates system memory 336 includes web server 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., web server 302) to send and receive network messages to the Internet using Hyper-Text Transfer Protocol (HTTP) messaging, thus enabling communication with service provider server 350.

Application programs 344 in web server 302's system memory also include a Pay Per Click Monitoring Program (PPCMP) 348, which receives PPC monitor data from monitor logic 349, and includes code for implementing the processes described in FIGS. 1A-2B. Note that the functionality of monitor logic 349 may be implemented in software or hardware. Additionally, the functionality of monitor logic 349 may be included as an integrated function of the software in PPCMP 348. In one embodiment, web server 302 is able to download PPCMP 348 from service provider server 350.

Also coupled to web server 302, via network 328, is a browser-based client computer 352, which is used by a person who is legitimately (or illegitimately) clicking the PPC advertisement link described above. Note that the architecture described for web server 302 may be substantially similar for service provider server 350 and browser-based client 352. Note also that the clickbot described above, which may be utilized by browser-based client 352 or another malicious computer (not shown), may be in a form that is not browser based, but instead is another specialized program that acts like a browser, thus emulating the Hyper Text Transfer Protocol (HTTP) that a real browser would produce. Thus, in one embodiment, browser-based client 352, despite its name, need not necessarily be "browser based."

The hardware elements depicted in web server 302 are not intended to be exhaustive, but rather are representative to highlight essential components required by the present invention. For instance, web server 302 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 350 performs all of the functions associated with the present invention (including execution of PPCMP 348), thus freeing web server 302 from using its resources. Note further that, in a preferred embodiment, processes described herein are designed to be executed on any general purpose server, including one having an architecture described in an exemplary manner in FIG. 3.

It should be understood that at least some aspects of the present invention may alternatively be implemented in a computer-useable medium that contains a program product. Programs defining functions of the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of PPCMP 348, are performed by service provider server 350. Alternatively, PPCMP 348 can be deployed as software from service provider server 350 to web server 302. This deployment may be performed in an "on demand" basis manner, in which PPCMP 348 is only deployed when needed by web server 302. In another embodiment, software for the method so described may be deployed to service provider server 350 by another service provider server (not shown).

The present disclosure thus provides for a method, system and computer-readable medium for reducing a financial impact of click fraud. In a preferred embodiment, the method includes, but is not limited to the steps of: setting a sampling percentage for fraud testing of click events for a Pay Per Click (PPC) advertisement link on a Publisher's website, wherein the sampling percentage is less than 100% of all click events at the PPC advertisement link; testing a sample of click events for fraudulent clicks of the PPC advertisement link, wherein the testing of the sample of click events for fraudulent clicks is directed to detecting fraudulent non-human clicks of the PPC advertisement link, and wherein a size of the sample of click events is based on the sampling percentage size; and in response to a percentage of fraudulent clicks being greater than a pre-determined tolerance level, reducing an advertisement charge for clicks of the PPC advertisement link. In one or more embodiments, the fraudulent clicks of the PPC advertisement link may be performed by one or more clickbots.

In one embodiment, the step of testing for fraudulent clicks includes the steps of: presenting a graphical display of non-standard text characters on the Publisher's website, wherein the non-standard text characters are designed to be undecipherable by a machine; and receiving an input that indicates that a human viewer of the non-standard text characters has been able to decipher the non-standard text characters. In another embodiment, the pre-determined tolerance level is adjusted according to an expected percentage of human viewers of the PPC advertisement link who fail to input an indication of their human ability to decipher the non-standard text characters. In such a scenario, and in response to the pre-determined tolerance level being exceeded, a financial incentive may be provided to human viewers to input the indication of their human ability to decipher the non-standard text characters. In one embodiment, the graphical display of non-standard text characters is presented on the Publisher's website only in response to a number of clicks of the PPC advertisement link exceeding a maximum threshold for a pre-determined length of time.

In another embodiment of the present disclosure, the testing for fraudulent clicks comprises: setting a maximum number of expected non-fraudulent clicks that are expected for the PPC advertisement link during a set amount of time; detecting an actual click count for the PPC advertisement link during the set amount of time; in response to the maximum number of expected non-fraudulent clicks being exceeded during the set amount of time, calculating the number of fraudulent clicks generated during the set amount of time, wherein the number of fraudulent clicks are determined by a calculated difference between the actual click count and the maximum number of expected non-fraudulent clicks; based on the calculated difference, calculating a percentage of fraudulent clicks for all websites that display the PPC advertisement link; and based on the percentage of fraudulent clicks, reducing an advertisement charge for clicks of the PPC advertisement link at any website. The maximum number of expected non-fraudulent clicks may be based in part on a time of day of the set amount of time; Internet Protocol (IP) addresses of browsing computers that are being used by users to view the PPC advertisement link; or the PPC advertisement link being previously determined as being associated with an industry or activity that is prone to fraudulent clicks of PPC advertisement links.

In another embodiment, in which the method described herein is performed by software that is stored on a computer-readable medium, the computer-usable medium is a component of a remote server, and the computer executable instructions are deployable to a web server from the remote server. This deployment may be provided by a service provider to a customer on an on-demand basis.

Note that the processes described above may be performed, either independently or in concert, by web server 302 and/or service provider server 350. For example, a first server may test for PPC click fraud and adjust advertising charges accordingly; or the first server may test for PPC click fraud and send a test result message to a second server, which then adjusts the advertising charges; or the first server may receive a result of the testing and adjust the advertising charges; or the first server may receive the test result message and transmit a message that indicates that the percentage of clicks that failed the testing is greater than the pre-determined tolerance level.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method of reducing a financial impact of click fraud, the computer-implemented method comprising:
    executing instructions on a processor unit, wherein the instructions, when executed, perform a process comprising:
        testing a random sample of click events for fraudulent clicks of a Pay Per Click (PPC) link, wherein the testing of the random sample of click events for fraudulent clicks is directed to detecting fraudulent non-human clicks of the PPC link, and wherein a sample size for testing the random sample of click events is based on a pre-determined significance factor;
        in response to the testing during a pre-determined period of time revealing that a percentage of clicks failing the testing is greater than a pre-determined tolerance level, presenting a graphical display of non-standard text characters, wherein the non-standard text characters are designed to be undecipherable by a machine, wherein the pre-determined period of time is an amount of time that is expected for a human user to use in order to manually execute a pre-determined quantity of clicks of the PPC link, and wherein the pre-determined period of time is greater than a pre-determined minimum length of time during which a clickbot is capable of executing two consecutive clicks of the PPC link;
        receiving an input that indicates that a human viewer of the non-standard text characters has been able to decipher the non-standard text characters; and
        in response to the percentage of clicks failing the testing being greater than the pre-determined tolerance level, reducing a charge for clicks of the PPC link.

2. The computer-implemented method of claim 1, further comprising:
    presenting the non-standard text characters as standard text characters in a pre-populated input box on a user interface (UI); and
    displaying a "yes" query block and a "no" query block on the UI, wherein clicking the "yes" query block confirms that the standard text characters and the non-standard text characters represent a same set of characters, and wherein clicking the "no" query block confirms that the standard text characters and the non-standard text characters represent different sets of characters.

3. The computer-implemented method of claim 1, further comprising:
    in response to the pre-determined tolerance level being exceeded, providing an immediate financial incentive to human viewers to input an indication of their human ability to decipher the non-standard text characters.

4. The computer-implemented method of claim 1, wherein the pre-determined significance factor is based on the PPC link having a history of increased clickbot abuse.

5. The computer-implemented method of claim 1, wherein the testing for fraudulent clicks comprises:
    setting a maximum number of expected non-fraudulent clicks that are expected for the PPC link during a set amount of time;
    detecting an actual click count for the PPC link during the set amount of time;
    in response to the maximum number of expected non-fraudulent clicks being exceeded during the set amount of time, calculating the number of fraudulent clicks generated during the set amount of time, wherein the number of fraudulent clicks are calculated by a calculated difference between the actual click count and the maximum number of expected non-fraudulent clicks;
    based on the calculated difference between the actual click count and the maximum number of expected non-fraudulent clicks, calculating a percentage of fraudulent clicks for the PPC link; and
    based on the percentage of fraudulent clicks for the PPC link, reducing a charge for clicks of the PPC link.

6. The computer-implemented method of claim 1, wherein the pre-determined significance factor is based on a time of day or night that has a history of past clickbot abuse.

7. The computer-implemented method of claim 1, wherein the pre-determined significance factor is based on a specific set of Internet Protocol (IP) addresses of browsing computers that are being used by users to view the PPC link, wherein the browsing computers using the specific set of IP addresses have a history of past clickbot abuse.

8. The computer-implemented method of claim 1, wherein the pre-determined significance factor is the PPC link providing a particular function that has a history of past clickbot abuse.

9. The computer-implemented method of claim 1, further comprising:
setting a sampling percentage size for fraud testing of click events for a Pay Per Click (PPC) link on a Publisher's website, wherein the sampling percentage size is less than all click events at the PPC link.

10. The computer-implemented method of claim 1, wherein the pre-determined significance factor is based on a seasonal shopping period that has a history of increased clickbot activity.

11. A system comprising:
a processor;
a data bus coupled to the processor;
a memory coupled to the data bus; and
a computer-usable medium embodying computer program code, the computer program code comprising instructions executable by the processor and configured for:
testing a random sample of click events for fraudulent clicks of a Pay Per Click (PPC) link, wherein the testing of the random sample of click events for fraudulent clicks is directed to detecting fraudulent non-human clicks of the PPC link, and wherein a sample size for testing the random sample of click events is based on a pre-determined significance factor;
in response to the testing during a pre-determined period of time revealing that a percentage of clicks failing the testing is greater than a pre-determined tolerance level, presenting a graphical display of non-standard text characters, wherein the non-standard text characters are designed to be undecipherable by a machine, wherein the pre-determined period of time is an amount of time that is expected for a human user to use in order to manually execute a pre-determined quantity of clicks of the PPC link, and wherein the pre-determined period of time is greater than a pre-determined minimum length of time during which a clickbot is capable of executing two consecutive clicks of the PPC link;
receiving an input that indicates that a human viewer of the non-standard text characters has been able to decipher the non-standard text characters; and
in response to the percentage of clicks failing the testing being greater than the pre-determined tolerance level, reducing a charge for clicks of the PPC link.

12. The system of claim 11, wherein the pre-determined tolerance level is adjusted according to an expected percentage of human viewers of the PPC link who fail to input an indication of their human ability to decipher the non-standard text characters.

13. The system of claim 11, wherein the maximum number of expected non-fraudulent clicks is based in part on Internet Protocol (IP) addresses of browsing computers that are being used by users to view the PPC link.

14. A computer-readable storage medium encoded with a computer program, the computer program comprising computer executable instructions configured for:
testing a random sample of click events for fraudulent clicks of a Pay Per Click (PPC) link, wherein the testing of the random sample of click events for fraudulent clicks is directed to detecting fraudulent non-human clicks of the PPC link, and wherein a sample size for testing the random sample of click events is based on a pre-determined significance factor;
in response to the testing during a pre-determined period of time revealing that a percentage of clicks failing the testing is greater than a pre-determined tolerance level, presenting a graphical display of non-standard text characters, wherein the non-standard text characters are designed to be undecipherable by a machine, wherein the pre-determined period of time is an amount of time that is expected for a human user to use in order to manually execute a pre-determined quantity of clicks of the PPC link, and wherein the pre-determined period of time is greater than a pre-determined minimum length of time during which a clickbot is capable of executing two consecutive clicks of the PPC link;
receiving an input that indicates that a human viewer of the non-standard text characters has been able to decipher the non-standard text characters; and
in response to the percentage of clicks failing the testing being greater than the pre-determined tolerance level, reducing a charge for clicks of the PPC link.

15. The computer-readable storage medium of claim 14, wherein the computer-readable storage medium is a component of a remote server, and wherein the computer executable instructions are deployed to a web server from the remote server.

16. The computer-readable storage medium of claim 14, wherein the computer executable instructions are provided by a service provider to a customer on an on-demand basis.

17. A computer-implemented method of reducing a financial impact of click fraud, the computer-implemented method comprising:
executing instructions on a processor unit, wherein the instructions, when executed, perform a process comprising:
testing a random sample of click events for fraudulent clicks of the PPC link, wherein the testing of the random sample of click events for fraudulent clicks is directed to detecting fraudulent non-human clicks of the PPC link, and wherein a sample size for testing the random sample of click events is based on a pre-determined significance factor;
in response to the testing during a pre-determined period of time revealing that a percentage of clicks failing the testing is greater than a pre-determined tolerance level, presenting a graphical display of non-standard text characters, wherein the non-standard text characters are designed to be undecipherable by a machine, wherein the pre-determined period of time is an amount of time that is expected for a human user to use in order to manually execute a pre-determined quantity of clicks of the PPC link, and wherein the pre-determined period of time is greater than a pre-determined minimum length of time during which a clickbot is capable of executing two consecutive clicks of the PPC link;
receiving an input that indicates that a human viewer of the non-standard text characters has been able to decipher the non-standard text characters; and
in response to the percentage of clicks failing the testing being greater than the pre-determined tolerance level, transmitting a message that indicates that the percentage of clicks that failed the testing is greater than the pre-determined tolerance level.

18. A computer-implemented method of reducing a financial impact of click fraud, the computer-implemented method comprising:
   executing instructions on a processor unit, wherein the instructions, when executed, perform a process comprising:
   in response to receiving a result of a testing during a pre-determined period of time, wherein the result of the testing reveals that a percentage of clicks failing the testing is greater than a pre-determined tolerance level, presenting a graphical display of non-standard text characters, wherein the non-standard text characters are designed to be undecipherable by a machine, wherein the pre-determined period of time is an amount of time that is expected for a human user to use in order to manually execute a pre-determined quantity of clicks of the PPC link, and wherein the pre-determined period of time is greater than a pre-determined minimum length of time during which a clickbot is capable of executing two consecutive clicks of the PPC link;
   receiving an input that indicates that a human viewer of the non-standard text characters has been able to decipher the non-standard text characters; and
   in response to the percentage of clicks failing the testing being greater than the pre-determined tolerance level, reducing a charge for clicks of the PPC link.

19. A computer-implemented method of reducing a financial impact of click fraud, the computer-implemented method comprising:
   executing instructions on a processor unit, wherein the instructions, when executed, perform a process comprising:
   receiving a result of a testing of a random sample of click events for fraudulent clicks of the PPC link, wherein the testing of the random sample of click events for fraudulent clicks is directed to detecting fraudulent non-human clicks of the PPC link, and wherein a sample size for testing the random sample of click events is based on a pre-determined significance factor;
   in response to the testing during a pre-determined period of time revealing that a percentage of clicks failing the testing is greater than a pre-determined tolerance level, presenting a graphical display of non-standard text characters, wherein the non-standard text characters are designed to be undecipherable by a machine, wherein the pre-determined period of time is an amount of time that is expected for a human user to use in order to manually execute a pre-determined quantity of clicks of the PPC link, and wherein the pre-determined period of time is greater than a pre-determined minimum length of time during which a clickbot is capable of executing two consecutive clicks of the PPC link;
   receiving an input that indicates that a human viewer of the non-standard text characters has been able to decipher the non-standard text characters; and
   in response to the percentage of clicks failing the testing being greater than the pre-determined tolerance level, transmitting a message that indicates that the percentage of clicks that failed the testing is greater than the pre-determined tolerance level.

* * * * *